(12) United States Patent
Harris et al.

(10) Patent No.: US 10,110,332 B2
(45) Date of Patent: Oct. 23, 2018

(54) DEVICES AND METHODS FOR IN-VEHICLE CONTENT LOCALIZATION

(71) Applicant: TOYOTA MOTOR ENGINEERING & MANUFACTURING NORTH AMERICA, INC., Erlanger, KY (US)

(72) Inventors: Ryan C. Harris, Sale, MI (US); Scott L. Frederick, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/401,151

(22) Filed: Jan. 9, 2017

(65) Prior Publication Data

US 2018/0198541 A1     Jul. 12, 2018

(51) Int. Cl.
*H04H 20/28* (2008.01)
*H04R 3/12* (2006.01)
*H04W 4/80* (2018.01)

(52) U.S. Cl.
CPC .............. *H04H 20/28* (2013.01); *H04R 3/12* (2013.01); *H04W 4/80* (2018.02); *H04R 2499/13* (2013.01)

(58) Field of Classification Search
CPC ............. H04M 1/609; H04M 2250/02; H04M 1/6075; H04M 1/6041; H04M 1/7253; H04M 3/568
USPC .......... 455/3.06, 3.01–3.05, 41.1, 41.2, 41.3, 455/569.2, 575.9, 420, 550.1, 569.1, 66.1, 455/345, 575.1, 445, 403, 422.1; 348/148, E7.085, E7.087, E7.09, 118, 348/140, 143, 373, 48; 381/86, 302, 110, 381/58; 701/1

See application file for complete search history.

(56) References Cited

U.S. PATENT DOCUMENTS

| | | |
|---|---|---|
| 4,866,515 A | 9/1989 | Tagawa et al. |
| 5,997,091 A | 12/1999 | Rech et al. |
| 7,742,610 B1 | 6/2010 | Hibino et al. |
| 8,655,157 B2 | 2/2014 | Yoshio et al. |
| 8,719,877 B2 * | 5/2014 | VonDoenhoff ..... B64D 11/0015 725/77 |
| 9,317,181 B2 | 4/2016 | Sizelove et al. |
| 2003/0091069 A1 | 5/2003 | Kraemer et al. |
| 2004/0003416 A1 | 1/2004 | Park |
| 2005/0268319 A1 | 12/2005 | Brady |
| 2011/0216913 A1 * | 9/2011 | Bonne ..................... H04R 5/02 381/77 |
| 2014/0270243 A1 * | 9/2014 | Bennett .................. B60N 2/502 381/86 |

(Continued)

FOREIGN PATENT DOCUMENTS

CN     203410367 U     1/2014
WO     WO199015508 A1     12/1990

*Primary Examiner* — Keith Ferguson
(74) *Attorney, Agent, or Firm* — Dinsmore & Shohl LLP (57) ABSTRACT

A method of distributing digital content to occupants of a vehicle using an in-vehicle entertainment system is provided. The method includes providing the digital content to a content distribution system. The digital content is selectively transmitted from the content distribution system to only one or some of a plurality of digital content access stations associated with seat locations within the vehicle. The digital content from the at least one of the plurality of digital content access stations is selectively transmitted to another of the plurality of digital content access stations.

15 Claims, 8 Drawing Sheets

(56) References Cited

U.S. PATENT DOCUMENTS

2014/0365073 A1* 12/2014 Stanek ................ H04M 1/6091
  701/36
2017/0070862 A1* 3/2017 Buttolo ................ H04W 4/046

* cited by examiner

DEVICES AND METHODS FOR IN-VEHICLE CONTENT LOCALIZATION

TECHNICAL FIELD

The present specification generally relates to in-vehicle entertainment systems and methods and, more specifically, to in-vehicle entertainment systems and methods that allow for selective distribution of personal digital content to one or more particular seat locations within the vehicle.

BACKGROUND

Current in-vehicle entertainment systems may allow for the transfer of one or more types of digital media from a mobile device to a global entertainment system within the vehicle. The global entertainment system may then provide the digital content from the mobile device globally throughout the vehicle. For example, the digital content may originate from a smart phone that has been paired with a Bluetooth connection provided by the vehicle. However, a need exists for alternative methods of selectively distributing and accessing digital content within vehicles.

SUMMARY

In one embodiment, a method of distributing digital content to occupants of a vehicle using an in-vehicle entertainment system is provided. The method includes providing the digital content to a content distribution system. The digital content is selectively transmitted from the content distribution system to at least one of a plurality of digital content access stations associated with seat locations within the vehicle. The digital content from the at least one of the plurality of digital content access stations is selectively transmitted to another of the plurality of digital content access stations.

In another embodiment, a method of distributing digital content between occupants of a vehicle using an in-vehicle entertainment system is provided. The method includes communicatively coupling a mobile device to a content distribution system of the vehicle. The digital content is transmitted from the mobile device to the content distribution system. The content distribution system is communicatively coupled to a plurality of digital content access stations. Each plurality of digital content access stations is associated with a respective seat location. The digital content is selectively transmitted from the content distribution system to only one or some of the plurality of digital content access stations.

In another embodiment, an in-vehicle entertainment system includes a content distribution system comprising one or more processors. A plurality of digital content access stations is associated with respective seat locations. The plurality of digital content access stations is configured to communicatively couple with the content distribution system. One or more memory modules are communicatively coupled to the one or more processors. The one or more memory modules store logic that when executed by the one or more processors, cause the system to communicatively couple the content distribution system to at least one of the plurality of digital content access stations. The digital content is transmitted from the content distribution system to at least one of the plurality of digital content access stations. The digital content is selectively transmitted from the at least one of the plurality of digital content access stations to another of the plurality of digital content access stations.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present specification are directed to systems and methods of distributing and accessing personal digital content within a vehicle to individual seat locations that include digital content access stations. One or more of the digital content access stations may communicatively couple to the mobile device and may include various content playing devices, such as headphones and microphones installed, for example, in headrests of seats within the vehicle or otherwise in the vicinity of the seat. Such methods and systems may use wireless and/or wired connections to communicatively couple to the digital content access stations and transfer content from the mobile device or other source to the individual seat locations in the vehicle.

Figure 1:
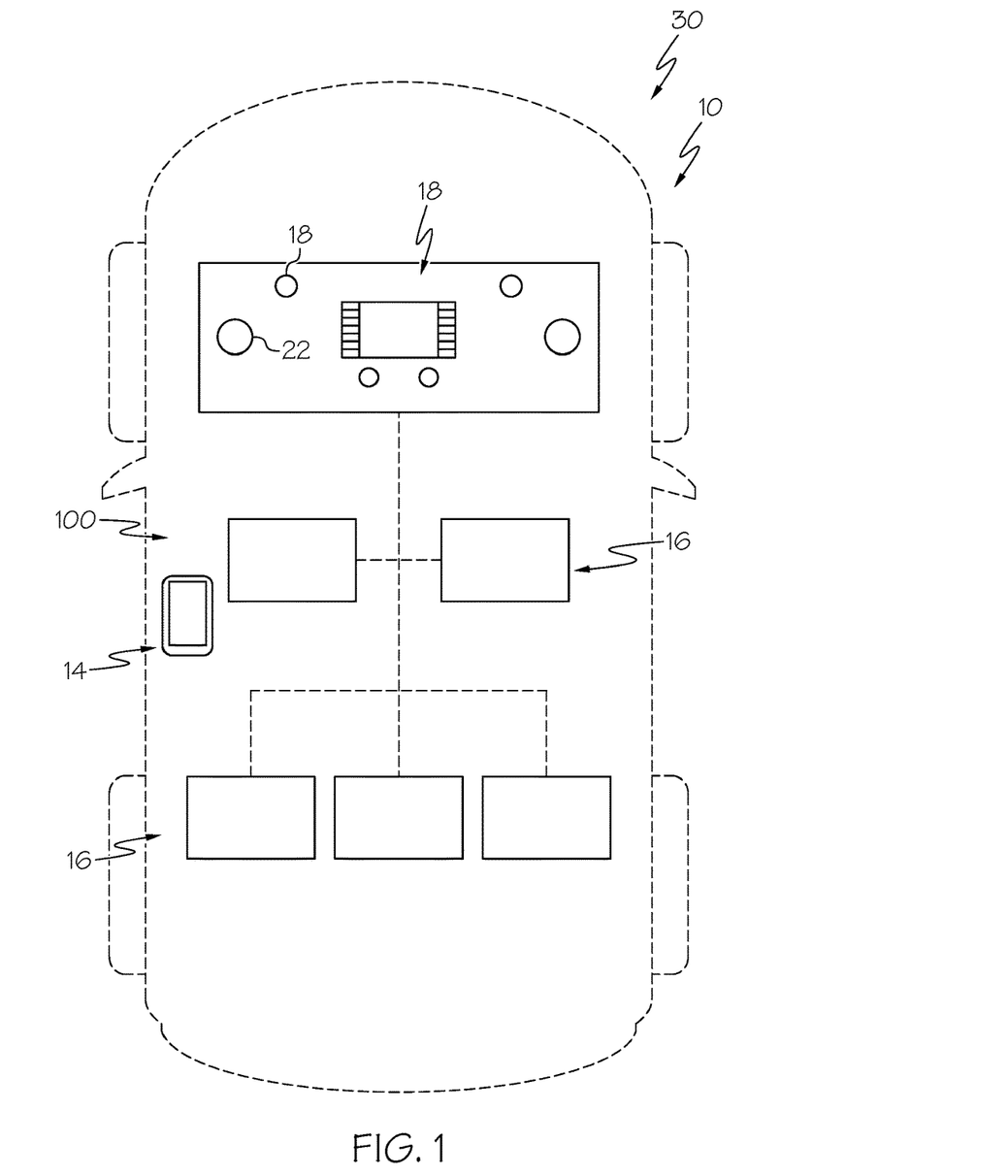
FIG. 1 is a schematic illustration of a vehicle including an in-vehicle entertainment system, according to one or more embodiments shown and described herein.

Referring to FIG. 1, a vehicle 30 includes an in-vehicle entertainment system 10. The in-vehicle entertainment system 10 may include a content distribution system 100 that distributes digital content from a mobile device 14 (e.g., a smart phone, tablet, personal computer, etc.) or other source within the vehicle 30 to digital content access stations 16 provided at various locations throughout the vehicle 30. In some embodiments, the digital content access stations 16 may be provided within individual seats of the vehicle, as will be described in greater detail below. The content distribution system 100 may also facilitate selective sharing of the digital content between the digital content access stations 16.

The vehicle 30 includes a display 18 that can provide one or more user interfaces and may be a touch screen and include other features for receiving user input. The display 18 and the user interfaces may be part of a head unit of the vehicle 30. Multiple displays 18 may be provided. The vehicle 30 may include one or more microphones 20 and one or more speakers 22. The microphone 20 may receive user voice commands and/or other inputs to the in-vehicle entertainment system 10. The speakers 22 may be utilized for providing audio digital content from the in-vehicle entertainment system 10 to the occupants.

Figure 2:
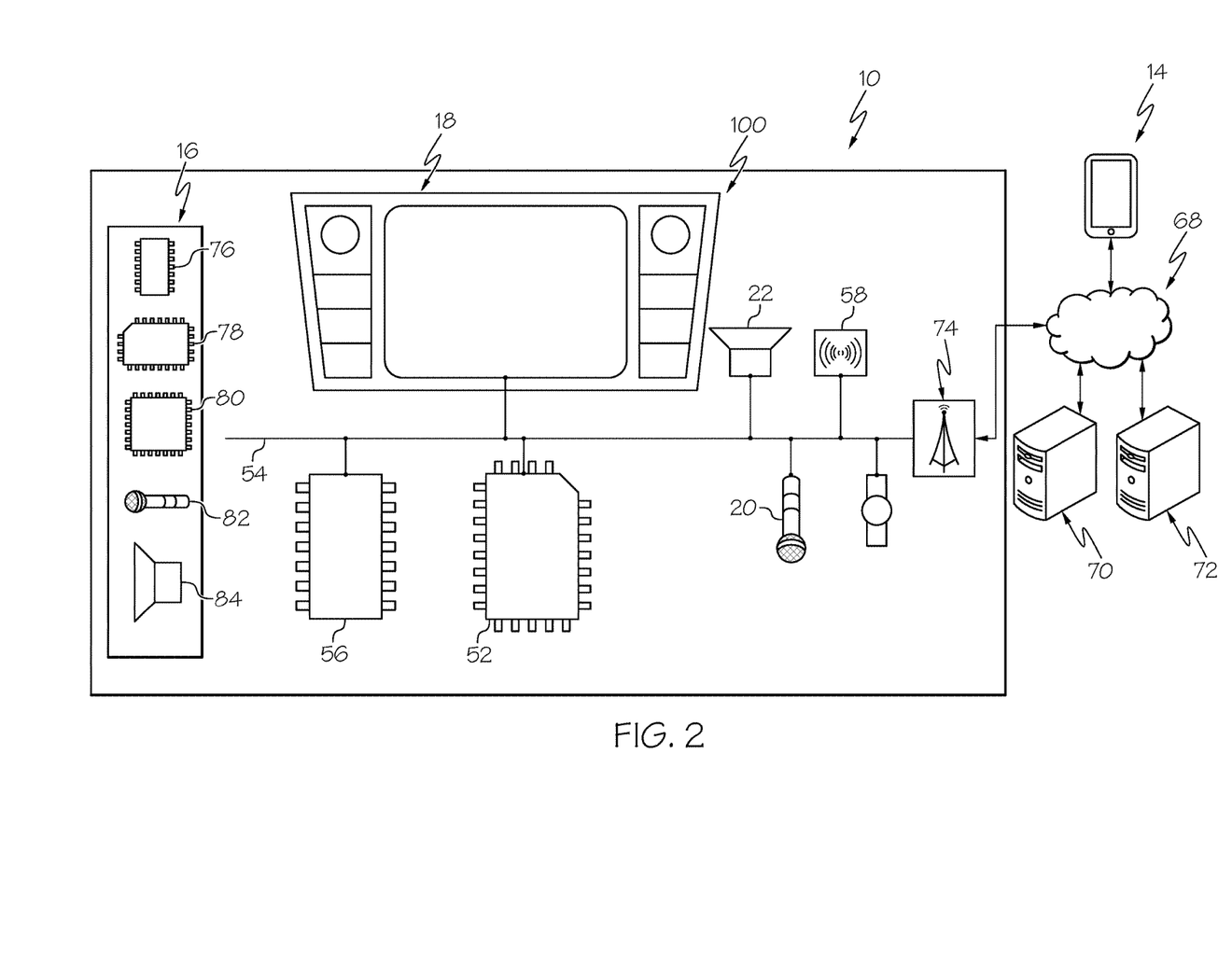
FIG. 2 is a schematic illustration of the in-vehicle entertainment system of FIG. 1, according to one or more embodiments shown and described herein.

Referring to FIG. 2, the in-vehicle entertainment system 10 including a number of the components described in FIG. 1 is schematically illustrated. The in-vehicle entertainment system 10 includes the content distribution system 100 that includes one or more processors 52, a communication path 54, one or more memory components 56, the display 18, the microphone 20, the speaker 22, network interface hardware 58, and the digital content access stations 16. The various components of the in-vehicle entertainment system 10 and interaction thereof will be described in greater detail below.

The in-vehicle entertainment system 10 includes the communication path 54, which may be formed from any medium capable of transmitting a signal such as, for example, conductive wires, conductive traces, optical waveguides, or the like. Moreover, the communication path 54 may be formed from a combination of mediums capable of transmitting signals. In one embodiment, the communication path 54 comprises a combination of conductive traces, conductive wires, connectors, and buses that cooperate to permit the transmission of electrical data signals to components such as processors, memories, sensors, input devices, output devices, and communication devices. Accordingly, the communication path 54 may comprise a vehicle bus, such as, for example, a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 54 communicatively couples the various components of the in-vehicle entertainment system 10. As used herein, the term "communicatively coupled" means that coupled components are capable of exchanging data signals with one another such as, for example, electrical signals via conductive medium, electromagnetic signals via air, optical signals via optical waveguides, and the like.

As noted above, the in-vehicle entertainment system 10 includes the one or more processors 52. Each one or more processor 52 may be any device capable of executing machine readable instructions (e.g., including device connectivity logic). Accordingly, each one or more processor 52 may be a controller, an integrated circuit, a microchip, a computer, or any other computing device. The one or more processors 52 are communicatively coupled to the other components of the in-vehicle entertainment system 10 by the communication path 54. Accordingly, the communication path 54 may communicatively couple any number of processors with one another, and allow the modules coupled to the communication path 54 to operate in a distributed computing environment. Specifically, each of the modules may operate as a node that may send and/or receive data.

As noted above, the in-vehicle entertainment system 10 includes the one or more memory components 56. Each one or more memory components 56 of the in-vehicle entertainment system 10 is coupled to the communication path 54 and communicatively coupled to the one or more processors 52. The one or more memory components 56 may include RAM, ROM, flash memories, hard drives, or any device capable of storing machine readable instructions such that the machine readable instructions can be accessed and executed by the one or more processors 52. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory components 56. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. Furthermore, the one or more memory components 56 may include machine readable instructions that, when executed by the one or more processors 52, cause the in-vehicle entertainment system 10 to perform the actions described herein.

Still referring to FIG. 2, as noted above, the in-vehicle entertainment system 10 includes the display 18 for providing visual output such as, for example, information, entertainment, maps, navigation, information, or a combination thereof. The display 18 is coupled to the communication path 54 and communicatively coupled to the one or more processors 52. Accordingly, the communication path 54 communicatively couples the display 18 to other modules of the in-vehicle entertainment system 10. The display 18 may include any medium capable of transmitting an optical output such as, for example, a cathode ray tube, light emitting diodes, a liquid crystal display, a plasma display, or the like. Moreover, the display 18 may be a touch screen that, in addition to providing optical information, detects the presence and location of a tactile input upon a surface of or adjacent to the display. Accordingly, the display 18 may receive mechanical input directly upon the optical output provided by the display. Additionally, it is noted that the display 18 can include at least one of the one or more processors 52 and the one or memory components 56.

The in-vehicle entertainment system 10 includes the speaker 22 for transforming data signals from the in-vehicle entertainment system 10 into mechanical vibrations, such as in order to output audible prompts or audible information. The speaker 22 is coupled to the communication path 54 and communicatively coupled to the one or more processors 52.

The in-vehicle entertainment system 10 may include tactile input hardware 64 coupled to the communication path 54 such that the communication path 54 communicatively couples the tactile input hardware 64 to other modules of the in-vehicle entertainment system 10. The tactile input hardware 64 may be any device capable of transforming mechanical, optical, or electrical signals into a data signal capable of being transmitted with the communication path

54. Specifically, the tactile input hardware 64 may include any number of movable objects that each transform physical motion into a data signal that can be transmitted over the communication path 54 such as, for example, a button, a switch, a knob, a microphone or the like. In some embodiments, the display 18 and the tactile input hardware 64 are combined as a single module and operate as an audio head unit or an infotainment system. The display 18 and the tactile input hardware 64 may be separate from one another and operate as a single module by exchanging signals via the communication path 54. In some embodiments, tactile input hardware may be provided by one or more displays distributed within the vehicle 30, such as at seat locations.

As noted above, the in-vehicle entertainment system 10 includes the microphone 20 for transforming acoustic vibrations received by the microphone 20 into a speech input signal. The microphone 20 is coupled to the communication path 54 and communicatively coupled to the one or more processors 52. The one or more processors 52 may process the speech input signals received from the microphone 20 and/or extract speech information from such signals, for example, to operate the in-vehicle entertainment system 10.

The in-vehicle entertainment system 10 includes the network interface hardware 58 for communicatively coupling the in-vehicle entertainment system 10 with a mobile device 14, a computer network and/or one or more of the digital content access stations 16. The network interface hardware 58 is coupled to the communication path 54 such that the communication path 54 communicatively couples the network interface hardware 58 to other modules of the in-vehicle entertainment system 10. The network interface hardware 58 can be any device capable of transmitting and/or receiving data via a wireless network. Accordingly, the network interface hardware 58 can include a communication transceiver for sending and/or receiving data according to any wireless communication standard. For example, the network interface hardware 58 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 58 includes a Bluetooth transceiver that enables the in-vehicle entertainment system 10 to exchange information with the mobile device 14 (e.g., a smart phone) and the digital content access stations 16 via Bluetooth communication.

Data from various applications running on the mobile device 14 or otherwise being provided by the mobile device 14 may be provided from the mobile device 14 to the in-vehicle entertainment system 10 via the network interface hardware 58. The mobile device 14 may be any device having hardware (e.g., chipsets, processors, memory, etc.) for communicatively coupling with the network interface hardware 66 and a cellular network 68. Specifically, the mobile device 14 may include an antenna for communicating over one or more of the wireless computer networks described above. Moreover, the mobile device 14 may include a mobile antenna for communicating with the cellular network 68. Accordingly, the mobile antenna may be configured to send and receive data according to a mobile telecommunication standard of any generation (e.g., 1G, 2G, 3G, 4G, 5G, etc.). Specific examples of the mobile device 14 include, but are not limited to, smart phones, tablet devices, e-readers, laptop computers, or the like.

The cellular network 68 generally includes a plurality of base stations that are configured to receive and transmit data according to mobile telecommunication standards. The base stations are further configured to receive and transmit data over wired systems such as public switched telephone network (PSTN) and backhaul networks. The cellular network 68 can further include any network accessible via the backhaul networks such as, for example, wide area networks, metropolitan area networks, the Internet, satellite networks, or the like. Thus, the base stations generally include one or more antennas, transceivers, and processors that execute machine readable instructions to exchange data over various wired and/or wireless networks.

The cellular network 68 can be utilized as a wireless access point by the mobile device 14 to access one or more servers (e.g., a first server 70 and/or a second server 72). The first server 70 and second server 72 generally include processors, memory, and chipset for delivering resources via the cellular network 68. Resources can include providing, for example, processing, storage, software, and information from the first server 70 and/or the second server 72 to the in-vehicle entertainment system 10 via the cellular network 68. Additionally, it is noted that the first server 70 or the second server 72 can share resources with one another over the cellular network 68 such as, for example, via the wired portion of the network, the wireless portion of the network, or combinations thereof.

The in-vehicle entertainment system 10 may include a satellite antenna 74 coupled to the communication path 54 such that the communication path 54 communicatively couples the satellite antenna 74 to other modules of the in-vehicle entertainment system 10. The satellite antenna 74 is configured to receive signals from global positioning system satellites. Specifically, in one embodiment, the satellite antenna 74 includes one or more conductive elements that interact with electromagnetic signals transmitted by global positioning system satellites. The received signal is transformed into a data signal indicative of the location (e.g., latitude and longitude) of the satellite antenna 74 or an object positioned near the satellite antenna 74, by the one or more processors 52. Additionally, it is noted that the satellite antenna 74 may include at least one of the one or more processors 52 and the one or memory components 56. In embodiments where the in-vehicle entertainment system 10 is coupled to the vehicle 30, the one or more processors 52 execute machine readable instructions to transform the global positioning satellite signals received by the satellite antenna 74 into data indicative of the current location of the vehicle 30.

The digital content access stations 16 may also include network interface hardware 76, processors 78, memory 80, a microphone 82 and a speaker 84 coupled by a communication path 86. These components of the digital content access stations 16 may be the same or similar to those described above. The digital content access stations 16 can communicate through the in-vehicle entertainment system 10 to each other and/or to the content distribution system 100, as will be described below to provided local access to digital content originating from the mobile device 14 or other vehicle system such as audio directions from a navigation system.

Figure 3:
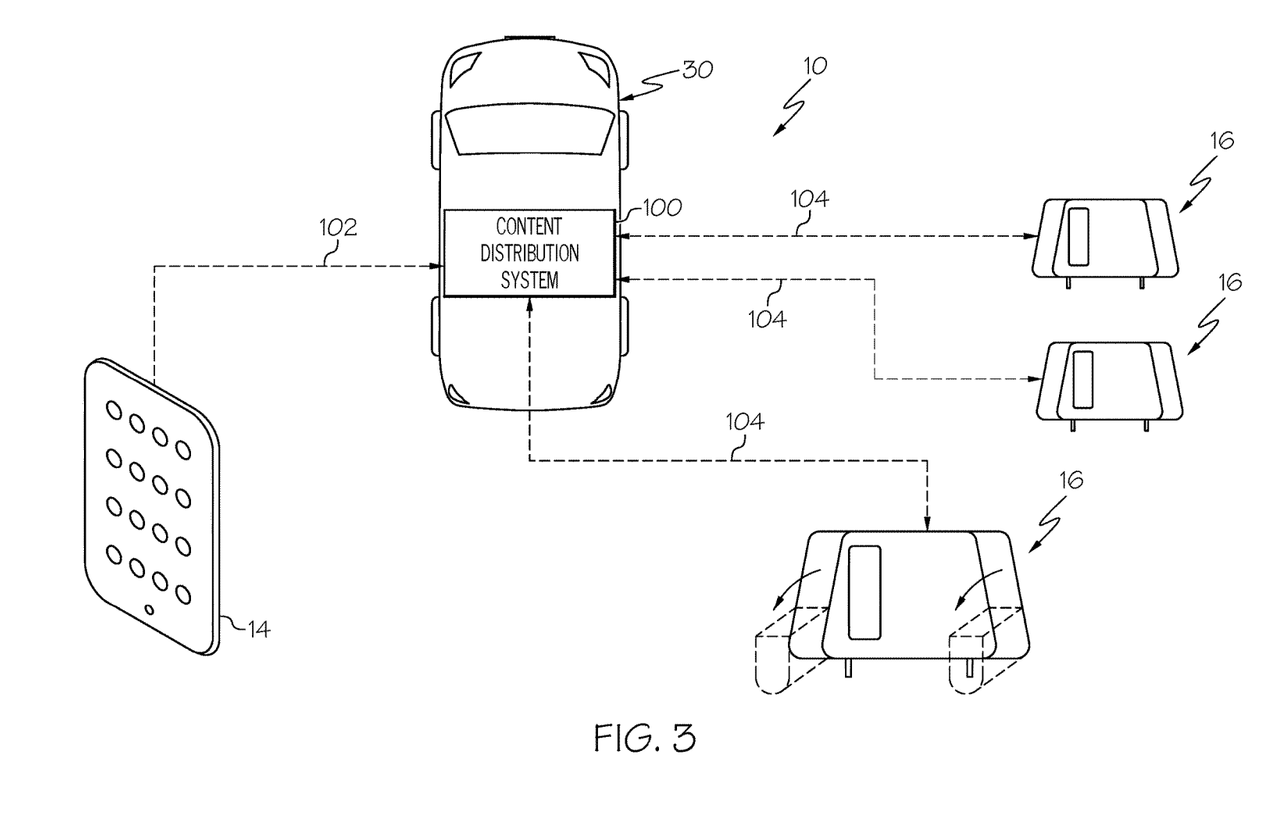
FIG. 3 depicts a system for distributing custom content within a vehicle using the in-vehicle entertainment system of FIG. 2 and an in-vehicle connection, according to one or more embodiments shown and described herein.

FIG. 3 illustrates a system of distributing digital content within the vehicle 30. In embodiments, the content distribution system 100 utilizes at least one mobile device 14 within the vehicle 30 to provide digital content. As discussed above, the mobile device 14 may be any suitable portable electronic device, such as tablets, laptop computers, smart phones, etc. The mobile device 14 may communicatively couple to the content distribution system 100 by a vehicle-based connection 102, such that content (e.g., music, video, application data, or other digital data) is transferred from the mobile device 14 to the content distribution system 100. The content distribution system 100 may then communicatively couple with one or more digital content access stations 16 to selectively provide digital content originating from the mobile device 14 to one or more digital content access stations 16 through one or more in-vehicle connections 104 for accessing the digital content locally 16. Further, the digital content access station 16 may send digital content back to the content distribution system 100 via the in-vehicle connection 104. It should be noted that while FIG. 3 illustrates the digital content originating from the mobile device, it may originate from a variety of other systems, such as a navigation system utilizing the satellite antenna 74 of FIG. 2.

Figure 4:
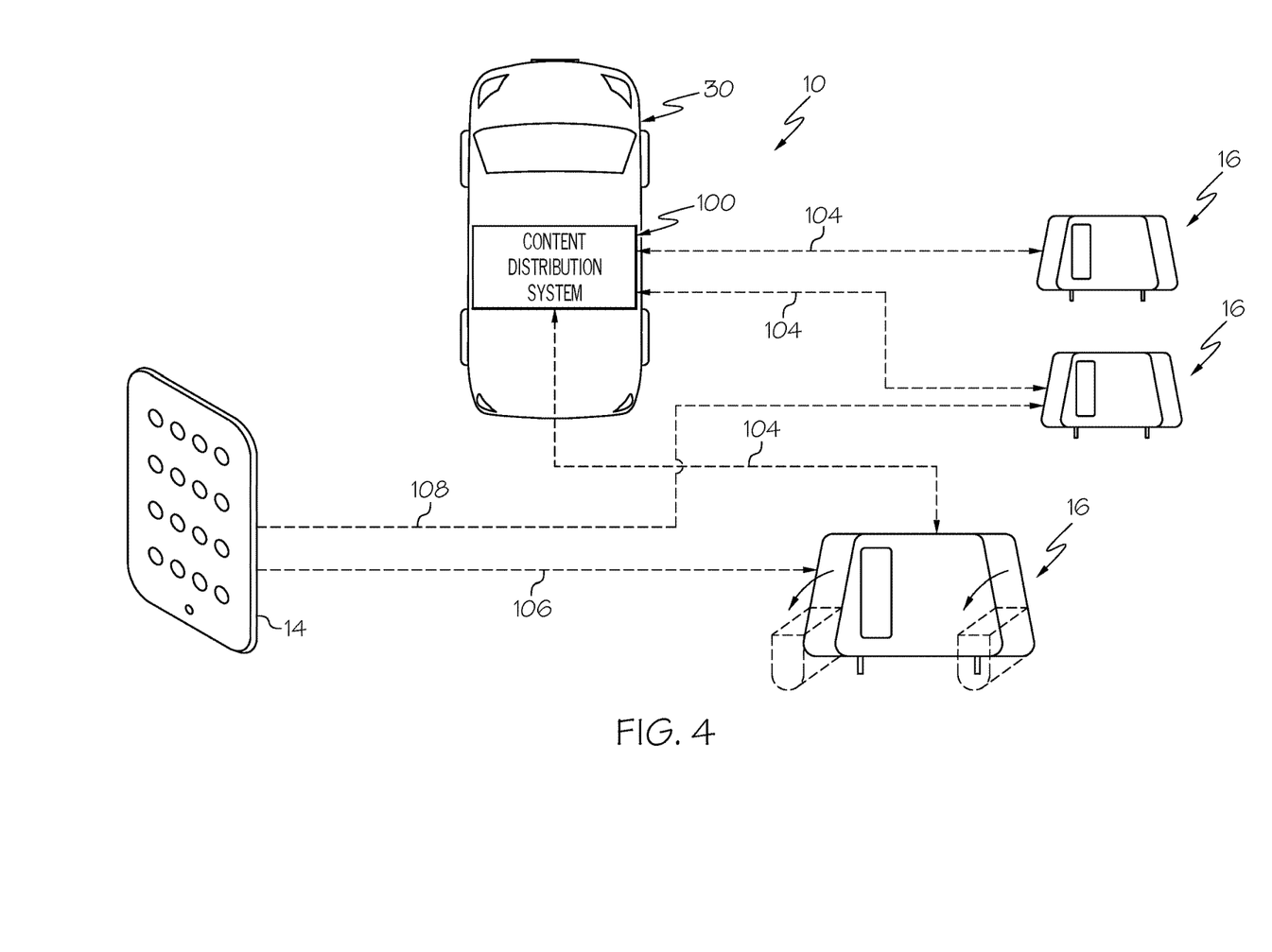
FIG. 4 depicts a system for distributing custom content within a vehicle using the in-vehicle entertainment system of FIG. 2 and another in-vehicle connection, according to one or more embodiments shown and described herein.

Referring now to FIG. 4, as another example, the mobile device 14 may communicatively couple to the vehicle content distribution system 100 via the digital content access station 16 by a vehicle-based connection 106 formed between the mobile device 14 and the vehicle content distribution system 100 using the digital content access station 16 as an intermediary device. The content distribution system 100 may then communicatively couple with one or more of the digital content access stations 16 to selectively provide digital content originating from the mobile device 14 to one or more digital content access stations 16. In such a system, digital content may transfer first from the mobile device 14 to the digital content access station 16 and then to the vehicle content distribution system 100. A user may pair the mobile device 14 with the digital content access station 16 without first pairing or otherwise establishing an initial connection with the content distribution system 100.

In such a system, data may continue to be transferred from the content distribution system 100 to the local digital content access station 16 via connections 104, which can provide repeatability and synchronize the digital content access stations 16 throughout the vehicle 30. This can allow multiple digital content access stations 16 to consume the same content. That is, content may be uploaded from a single mobile device 14 to the content distribution system 100 via a particular digital content access station 16 for distribution back to the same digital content access station 16 and/or other digital content access stations 16.

Still referring to FIG. 4, the mobile device 14 may communicatively couple to another digital content access station 16 using another vehicle-based connection 108 between the mobile device 14 of one user and the digital content access station 16 of another user. In this example, multiple digital content access stations 16 may be communicatively connected to the same mobile device 14. Using this method of content distribution within the vehicle 30, one or more digital content access stations 16 may receive content from one mobile device 14 and consume that content through their respective digital content access station 16 synchronously.

Figure 5:
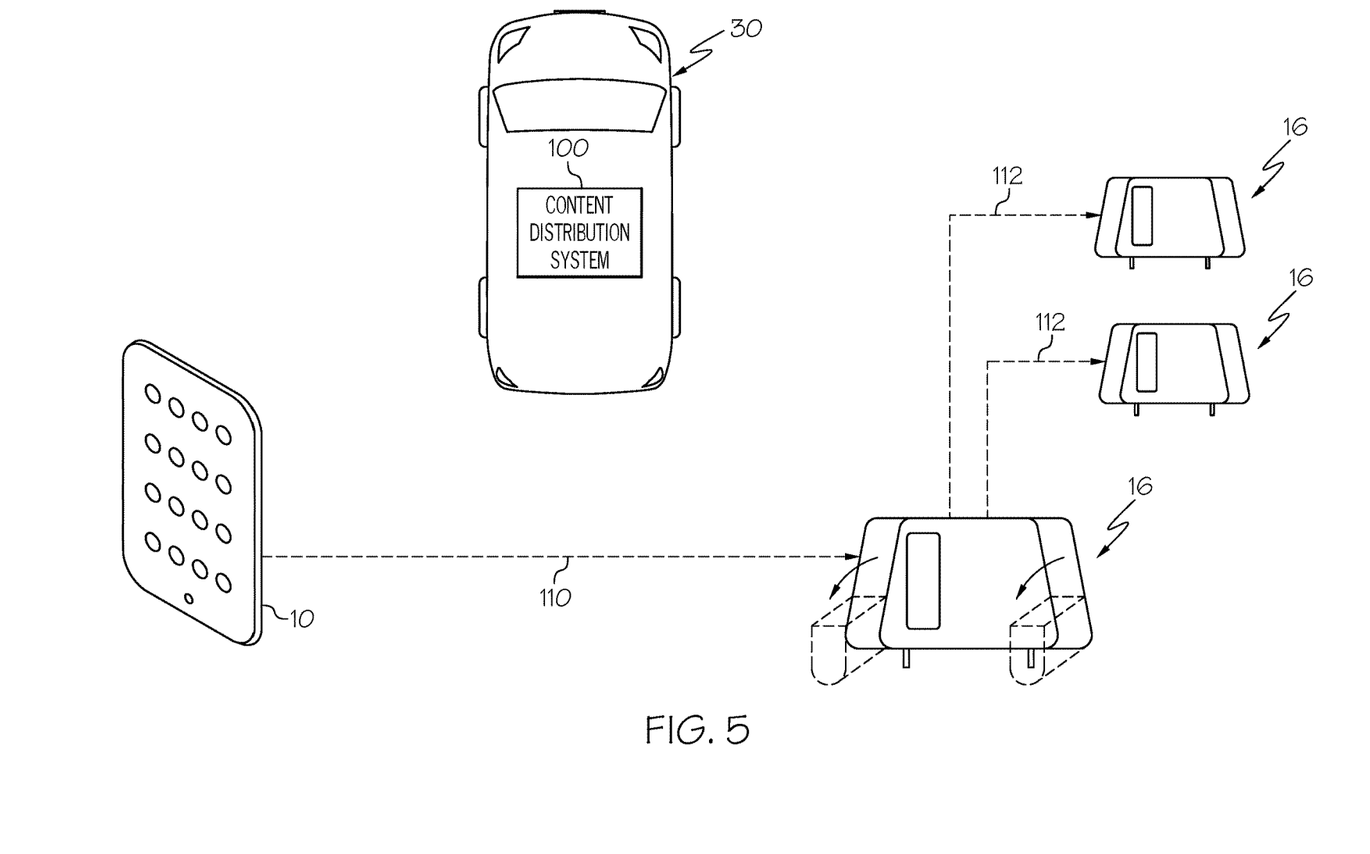
FIG. 5 depicts a system for distributing custom content within a vehicle using the in-vehicle entertainment system of FIG. 2 and another in-vehicle connection, according to one or more embodiments shown and described herein.

Referring to FIG. 5, the mobile device 14 may communicatively couple to the digital content access station 16 and digital content may be relayed from the digital content access station 16 directly to various other local digital content access stations 16 within the vehicle 30 using an inter-transceiver connection 112. Such a system can allow for the synchronous playing of digital content at the various digital content access stations 16 through a connection between one mobile device 14 and one digital content access station 16, then selectively relaying that signal to one or more other digital content access stations 16.

Certain embodiments may involve establishing and maintaining a piconet. A piconet is an ad hoc network linking a wireless user group of devices using Bluetooth technology protocols. A piconet consists of two or more devices occupying the same physical channel, synchronized to a common clock and hopping sequence. It allows one primary device to interconnect with multiple other active devices at one time. Hence, in some piconets, multiple individual devices can interact with (i.e., be "paired" with) a vehicle content distribution system at one time. In some piconets, up to 255 devices can be inactive (or "parked") allowing for the primary device to bring the other devices active at any time so long as an active station goes inactive first.

Thus, in a vehicle having a given number of seats, assuming all seats are occupied by a passenger having a mobile device 14, each occupant may actively pair one mobile device 14 to the content distribution system 100. In some embodiments, each occupant may actively pair more than one mobile device to the content distribution system 100. Further, the users could each have several mobile devices 14 paired to the vehicle-content distribution system 100 in an inactive status where digital content is not actively being transferred between the mobile device and the content distribution system 100.

Bluetooth networks transmit data via low-power radio waves. Devices communicate on a frequency spectrum of 2.402 GHz to 2.480 GHz. Each Bluetooth channel has a frequency bandwidth of approximately 1 MHz, giving any Bluetooth system approximately 80 channels on which to cycle devices. Bluetooth uses a technique called spread-spectrum frequency hopping to prevent multiple devices from using the same channel at any given instant. One device within a piconet can give instructions to each of the other devices regarding which frequencies to occupy at which times to reduce interference between the devices. Such frequency hopping allows multiple other devices to connect to one primary device at any time. As an example, up to seven devices may actively pair with the vehicle content distribution system 100 at any given time to send and receive digital content from the system.

Figure 6:
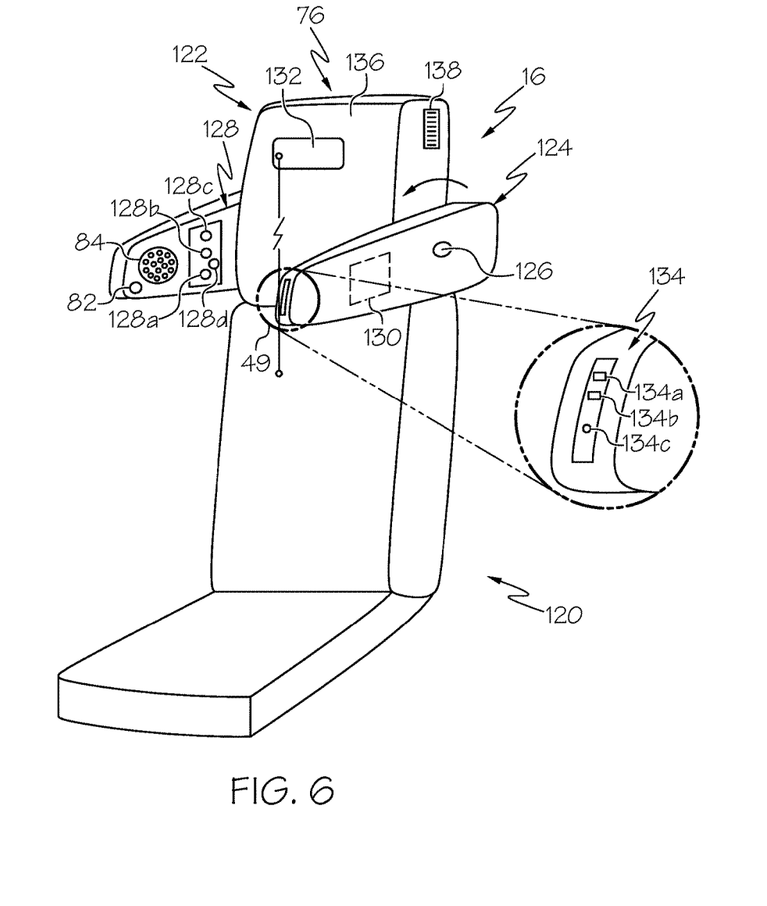
FIG. 6 is a schematic illustration of a digital content access station for use with the in-vehicle entertainment system of FIG. 2, according to one or more embodiments shown and described herein.

Referring now to FIG. 6, an exemplary embodiment of a digital content access station 16 provided by a vehicle seat 120 is shown. Generally, a digital content access station 16 may include a pair of headphones or speakers 84 and the microphone 82 provided in a headrest 122. In certain embodiments, the digital content access station 16 may be connectable to the vehicle content distribution system 100 using a wireless connection or a wired connection as discussed above. The speakers 84 of the digital content access station 16 may be incorporated in in-ear or over-ear headphones. In some embodiments, the speakers 84 may be incorporated in active noise cancelling or passive noise cancelling headphones. In some embodiments, each digital content access station 16 includes the network interface hardware 76 capable of interacting with the vehicle content distribution system 100, other digital content access stations 16 and the various mobile devices 14 within the vehicle 30.

The digital content access station 16 may be incorporated into the vehicle seat 120, as shown. Some digital content access stations 16 may be compatible with one or more seats throughout the vehicle such that they can be interchanged from one seat to another depending on user preference. In one non-limiting example, if the digital content access station 16 paired with one user's mobile device 14 happens to be incorporated in a seat that user is not sitting in, the user can switch the headrest 122 and associated digital content access station 16 to his or her own seat. Particular headrests 122 may have rotatable speaker arms 124. Such arms 124 may be rotatable around a rotation axis 126 and may include various components such as the speakers 84, the microphone 82, and a control panel 128 for controlling the digital content access station 16. Such a control panel 128 may include a power button 128a to enable the user to cycle power to the digital content access station 16.

Additionally, the control panel 128 may include a pairing button 128b for pairing individual mobile devices 14. In some embodiments, the control panel 128 might include an indicator light 128c capable of displaying various colors in order to cue the user to certain device functions, such as when power is applied to the digital content access station 16, when the digital content access station 16 is in a pairing mode, or whether media is being played by the digital content access station 16. The indicator light 128c may be a light-emitting diode (LED) or any other suitable visual indicator. Additionally, the control panel 128 might include a volume button 128d for increasing or decreasing the volume of the content projected through the speakers 84.

The digital content access station 16 may include a Bluetooth transceiver 130 for sending and receiving Bluetooth signals. The transceiver 130 may communicative coupling schemes as shown in FIGS. 3-5 by connecting the digital content access station 16 to an individual mobile device 14 and/or to other digital content access stations 16. Additionally, in certain embodiments, the digital content access station 16 may house the memory 80 (FIG. 2) such that if a particular user of the vehicle 30 has previously paired a mobile device 14 with the digital content access station 16 the digital content access station 16 will remember the mobile device 14 and preferentially pair with that mobile device 14 again in the future.

An embodiment including the memory 80 enables convenient preferential seating within the vehicle. Since many vehicles have users who frequently use the same seat across different trips in the vehicle 30, the memory 80 may be used to automatically pair with the mobile device 14 of the user that most often or routinely sits in a particular seat. Additionally, because in certain embodiments the digital content access station 16 may be capable of swapping between seats, if a user desires to sit in a separate seat and still be paired with their usual digital content access station 16, the user can simply remove the digital content access station 16 from a first seat and place it on another.

In some embodiments, the digital content access station 16 may house a battery 132. Such a battery 132 may be used to power the digital content access station 16 and/or to charge a user's mobile device 14 through various ports 134 attached to the digital content access station 16. The battery 132 may be housed within a main body 136 of the headrest 122 or, in headrests 122 having rotatable speaker arms 124, within one of the rotatable speaker arms 124. The battery 132 may be charged through an electrical connection with the vehicle 30 or separately. Additionally, the digital content access station 16 may be used to charge or power individual mobile devices 14 using the battery 132 or directly through the electrical connection with the automobile's main power distribution circuits using the plurality of input/output ports 134 on the digital content access station 16. Such ports 134 may include various types and sizes of USB ports 134a and 134b, an auxiliary cable port 134c, or any other suitable port.

In some embodiments, the digital content access station 16 might include a battery indication light 138 for indicating the status of the battery 132. Such a light may be installed on the main body 136 of the digital content access station 16 or, in embodiments including rotatable arms 124, on one of rotatable arms 124. A user may quickly realize the status of the battery 132 whether fully charged, only partially charged, or empty through a quick visual representation of the battery's charge.

Figure 6A:
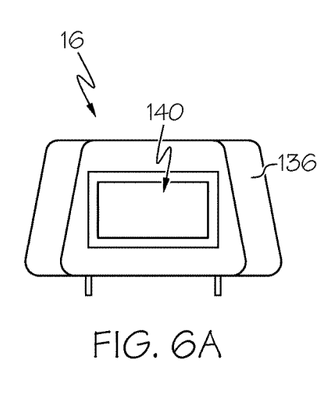
FIG. 6A is a detail, rear view of the digital content access station of FIG. 6.

Referring briefly to FIG. 6A, the headrests 122 may house a display 140 for displaying visually-based digital content such as DVDs, digital video files, streaming internet data and the like. The display 140 may lie in a vehicle-rearward-facing surface of the main body 136 for vehicle-rearward projection, making viewing possible for the occupant seated behind the user whose seat houses the digital content access station 16. The content displayed on the digital content access station 16 of a first user might coincide with or be synchronized with the audio content playing through the speakers of a second user immediately behind the first user such that content having both an audio and visual component, such as a movie, can be consumed coincidentally by the second user. That is, referring briefly to FIG. 7, if the user in seat 120c wanted to watch a video and listen to the audio track of that video at the same time, the video may be projected on the screen located on the digital content access station 16 of seat 120a and the audio may be delivered through the speakers of the digital content access station 16 of seat 120c.

Figure 7:
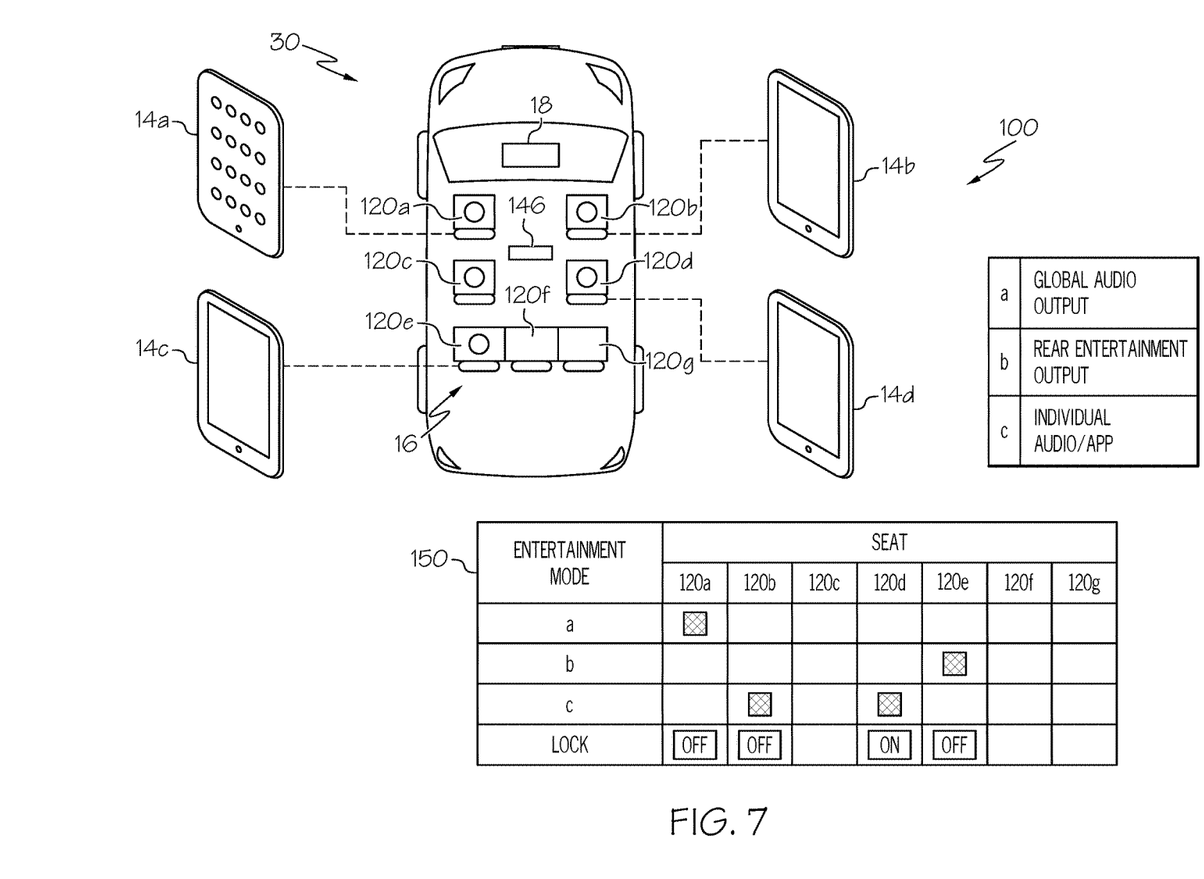
FIG. 7 depicts an exemplary implementation of the in-vehicle entertainment system of FIG. 2, according to one or more embodiments shown and described herein.

Referring now to FIG. 7, one possible implementation of the vehicle content distribution system 100 is shown. FIG. 7 shows the vehicle 30 having seven (7) seats 120a-120g, and four (4) passengers (a front-left passenger, a front-right passenger, a middle-right passenger, and a rear-left passenger), each passenger having an individual mobile device 14a-14d. However, in various embodiments any number of vehicle seats and passengers is possible. Additionally, an individual passenger may have multiple smart devices connected to the vehicle content distribution system 100 or their individual vehicle-based entertainment component at any given time. In some embodiments, each seat corresponds to one digital content access station 16. The vehicle content distribution system 100 may include the display 18. This display 18 may be a touch screen or any other suitable device for controlling the content distribution system 100. Additionally, some embodiments may include a rear entertainment console 146 that includes separate USB, auxiliary cable, DVD, CD, AM/FM/SAT, or any other suitable inputs. In one embodiment, mobile devices 14a-14d may be communicatively coupled to the vehicle content distribution system 100. The mobile devices 14a-14d may be communicatively coupled to the content distribution system 100 through a connection directly with the vehicle content distribution system 100 (as shown in FIG. 3) or through connections via their respective digital content access stations 16 (as shown in FIG. 4). Once a connection is established between the mobile device 14a-14d and the vehicle content distribution system 100 content may be transmitted from the mobile device 14a-14d to the content distribution system 100 and vice-versa.

Each passenger within the vehicle may have several choices of entertainment. In some embodiments, each choice of entertainment may coincide with a particular representative indication on the vehicle information screen at an entertainment-selection interface 150, e.g., provided by the display 18. The entertainment choice may coincide with what particular entertainment is playing through the user's digital content access station 16, through the in-vehicle entertainment system 10 generally or through any other digital content access station 16.

To facilitate selection of a type of entertainment, some embodiments may include the entertainment-selection interface 150. The entertainment-selection interface 150 can allow a user to see and to select which entertainment mode any particular digital content access station 16 within the vehicle 30 is in at any given time. The square within one of the three blocks associated with each channel represents a selectable, visual representation of the current status. This entertainment-selection interface 150 can allow a passenger to select the input to his or her own digital content access station 16 and can be interacted with utilizing any one of the displays located within the vehicle 30. It should be noted that the entertainment-selection interface 150 depicted is merely exemplary as there are a variety of interactive graphical indicia possible.

In the embodiment shown, a passenger can select between three inputs, but embodiments are not so limited. Shown here, a passenger can select between a global audio output (i.e., what is being played on the global speaker system 22 of FIG. 2), a rear entertainment output (i.e., whatever input is currently selected by the rear entertainment system), or an individual input (i.e., a connection with the smart device of the user or another user within the vehicle). For example, a front-right passenger in seat 120*b* may have selected entertainment mode "c" corresponding with individual mobile device 14*b*. In this mode, the audio content of the mobile device 14*b* can play through the speakers 84 installed on the digital content access station 16 associated with that seat 120*b*.

The digital content access stations may also have priority logic. For example, if a phone call is received by the mobile device 14*b* of the passenger in seat 120*b*, the audio of the call may override playing of digital content originating from the mobile device 14 and be heard at seat 120*b* through the speakers 84 of the digital content access station 16. Additionally, the microphone 82 in the digital content access station 16 can be used to transmit audio from the passenger to the caller and/or to other digital content access stations 16. Such priority may also allow for navigational information from a navigation system to be played through the speakers 84 of the digital content access station 16 of a particular seat location (e.g., the driver) instead of other content types.

In another non-limiting example, FIG. 7 shows the passenger in the left-rear seat 120*e* as selecting the rear-entertainment output. Hence, if a DVD or some other content is being played through the rear-entertainment console, the audio content of that DVD will be heard through the speakers 84 in the digital content access station 16 associated with the left-rear seat 120*e*.

In some embodiments, there may be more than one entertainment-selection interface 150. For example, the entertainment-selection interface 150 may be included at the display 18, at the rear entertainment console 146, or individually at individual display panels associated with each seat 120. Thus, in particular embodiments, the user may have the ability to select a channel for their own vehicle-based entertainment component giving his or her own seat more autonomy. Conversely, one user (e.g., the driver) may have the ability to select which seat is experiencing what content or to push content from one seat location to another. This may inhibit or allow other passengers in the vehicle 30 to access content.

Figure 8:
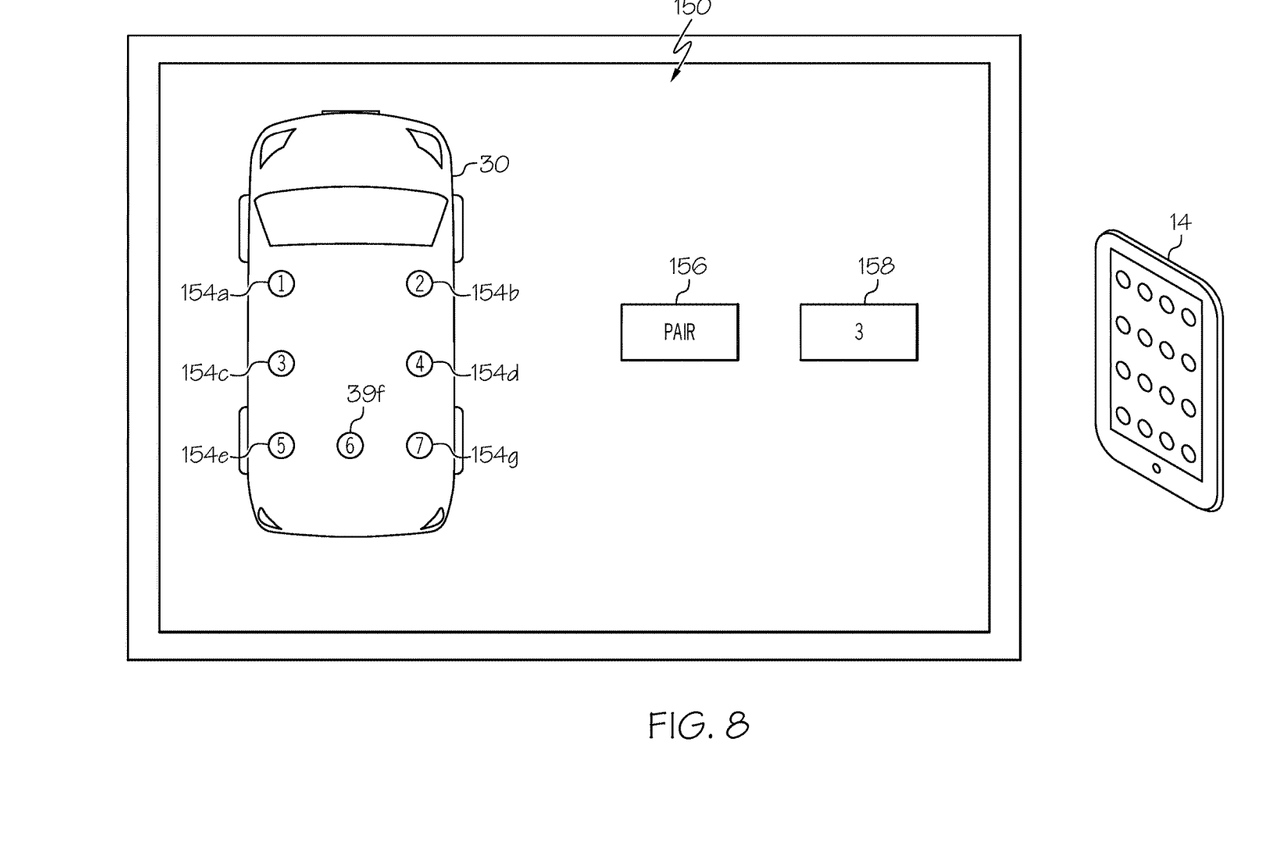
FIG. 8 illustrates an entertainment selection interface for use in communicatively coupling device within a vehicle using the in-vehicle entertainment system, according to one or more embodiment shown and described herein.

Referring now to FIG. 8, the entertainment selection interface 150 for pairing various mobile devices 14 within the vehicle 30 is depicted. The vehicle 30 having seven (7) seats 120 is shown; however, a vehicle having any number of seats may be used. In some embodiments, the entertainment selection interface 150 may generally show an outline of the vehicle 30 that is actually in use in order to better orient the user to the relative location of various seat locations within the vehicle 30. Within the outline of the vehicle 30 may be various numeric representations 154*a*-154*g* of the seats within the vehicle 30. Each numeric representation 154*a*-154*g* may correspond with a seat 120 in the vehicle 30 having the digital content access station 16. In embodiments using Bluetooth to pair devices with the content distribution system 100, the entertainment selection interface 150 may show a button labeled "pair." Additionally, a seat selection button 158 may inform the user what digital content access station 16 the content distribution system 100 is ready to pair with, e.g., in FIG. 8, the content distribution system is ready to pair with seat 3.

In order to pair the mobile device 14 with a particular digital content access station 16, the mobile device 14 is placed in pair mode, the vehicle 30 is placed in pair mode and an individual seat or seats with which to pair the mobile device 14 is selected. Once the mobile device 14 is communicatively coupled with the digital content access station 16, content can be sent from the mobile device 14 to digital content access station 16 associated with the seat or seats. In some embodiments, the user may have the capability to end a pair at the user's own seat using installed equipment such as a screen installed on the digital content access station 16 of the seat in front of a user, the power button on the digital content access station 16, or the pairing button on the digital content access station. This can allow a user to stop experiencing content by simply deactivating their particular digital content access station or unpair the mobile device 14 that may be providing content.

The above-described in-vehicle entertainment systems including content distribution systems allow for selective access and distribution of personal digital content to various seat locations within the vehicle. The seat locations may include digital content access stations that can communicatively connect to the content distribution system for receiving and providing digital content. The digital content access stations can also communicatively connect to one another for providing digital content between seat locations. The digital content access stations can incorporate various audio and video devices at the seat locations to provide the digital content locally to an occupant at a particular seat location. Such an arrangement can allow multiple occupants to select different content sources to access at their particular seat location.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of distributing a digital content signal to occupants of a vehicle using an in-vehicle entertainment system, the method comprising:

providing the digital content signal to one of a plurality of digital content access stations associated with seat locations within the vehicle wherein each of the plurality of digital content access stations comprise a transceiver for establishing a wireless connection with each other; and selectively transmitting the digital content signal from the one of the plurality of digital content access stations to another of the plurality of digital content access stations through an inter-transceiver connection from the one of the plurality of digital content access stations directly to another of the digital content access stations of the plurality of digital content access stations, wherein the digital content signal originates from a mobile device based on a user input by a user, and the digital content signal is selectively transmitted from the one of the plurality of the digital content access stations to another of the plurality of digital content access stations by another user input by the user.

2. The method of claim 1, wherein the step of selectively transmitting the digital content signal directly to another of the plurality of digital content access stations includes selectively excluding a first digital content access station associated with a first seat location from receiving the digital content signal.

3. The method of claim 1, wherein the digital content signal originates from a mobile device.

4. The method of claim 1 further comprising providing the digital content signal to a content distribution system.

5. The method of claim 4 further comprising communicatively coupling the first digital content access station to the content distribution system.

6. The method of claim 1 further comprising communicatively coupling a mobile device to at least one of the plurality of digital content access stations.

7. The method of claim 1, wherein the plurality of digital content access stations comprise a speaker for playing digital content that is incorporated into a seat at the respective seat location.

8. The method of claim 7, wherein the plurality of digital content access stations comprise a microphone that is incorporated into the seat at the associated seat location.

9. A method of distributing a digital content signal between occupants of a vehicle using an in-vehicle entertainment system, the method comprising:
communicatively coupling a mobile device to a digital content access station of the vehicle wherein the digital content access station is associated with a seat location and comprises a transceiver;
transmitting the digital content signal from the mobile device to the digital content access station based on a user input by a user;
communicatively coupling the digital content access station to a plurality of digital content access stations, wherein each of the plurality of digital content access stations is associated with a respective seat location and comprises a transceiver for establishing a wireless inter-transceiver connection directly with each other; and selectively transmitting the digital content signal from the digital content access station to only one or some of the plurality of digital content access stations, wherein
the digital content signal is selectively transmitted from the digital content access station to another of the plurality of digital content access stations by another user input by the user.

10. The method of claim 9, wherein the step of selectively transmitting the digital content signal to only one or some of the plurality of digital content access stations includes selectively excluding a digital content access station associated with a seat location from receiving the digital content.

11. The method of claim 9, wherein the plurality of digital content access stations comprise a speaker for playing digital content that is incorporated into a seat at the respective seat location.

12. The method of claim 9 further comprising communicatively coupling another mobile device to a first digital content access station of the plurality of digital content access stations.

13. The method of claim 12 further comprising transmitting a second digital content signal from the another mobile device to the first digital content access station, wherein the second digital content signal of the another mobile device is different than the digital content signal of the mobile device communicatively coupled to the digital content access station.

14. An in-vehicle entertainment system, comprising:
a content distribution system comprising one or more processors;
a plurality of digital content access stations associated with respective seat locations, the plurality of digital content access stations configured to communicatively couple with the content distribution system and each of the plurality of digital content access stations comprising a transceiver for establishing a wireless connection directly with each other; and
one or more memory modules communicatively coupled to the one or more processors, the one or more memory modules storing logic that when executed by the one or more processors, cause one of the plurality of digital content access stations to:
receive a digital content signal that originates from a mobile device based on a user input by a user;
transmit the digital content signal from the one of the plurality of digital content access stations to another of the plurality of digital content access stations; and
selectively transmit the digital content signal from the one of the plurality of digital content access stations to another of the plurality of digital content access stations through an inter-transceiver connection directly from the one of the plurality of digital content access stations to the another of the digital content access stations of the plurality of digital content access stations based on another user input by the user.

15. The system of claim 14, wherein the plurality of digital content access stations comprise a speaker for playing digital content that is incorporated into a seat at the respective seat location.

* * * * *